(No Model.)  5 Sheets—Sheet 1.

J. C. CHAMBERLAIN.
DEVICE FOR UNLOADING, RECHARGING, AND RELOADING ELECTRIC CAR BATTERIES.

No. 427,459.  Patented May 6, 1890.

(No Model.) 5 Sheets—Sheet 2.
J. C. CHAMBERLAIN.
DEVICE FOR UNLOADING, RECHARGING, AND RELOADING ELECTRIC CAR BATTERIES.
No. 427,459. Patented May 6, 1890.
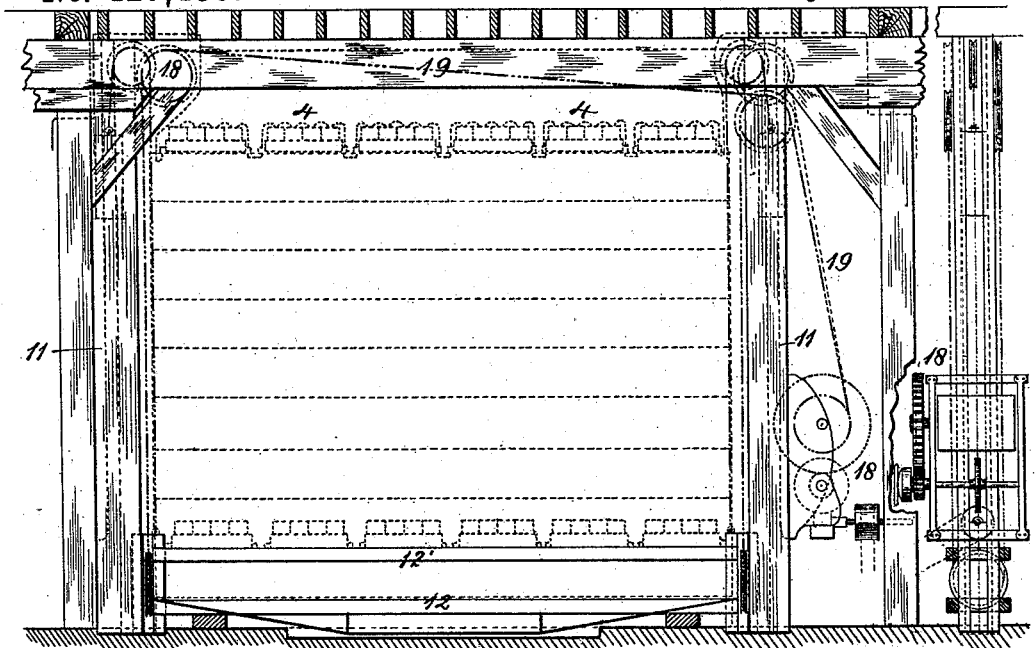
Fig. 2. Fig. 3.
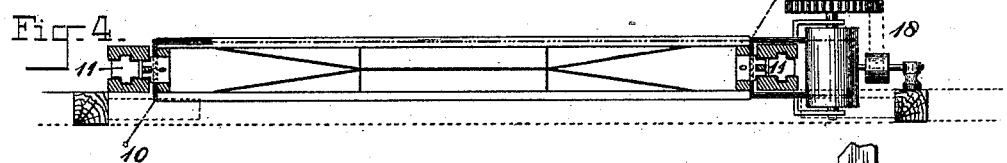
Fig. 4.
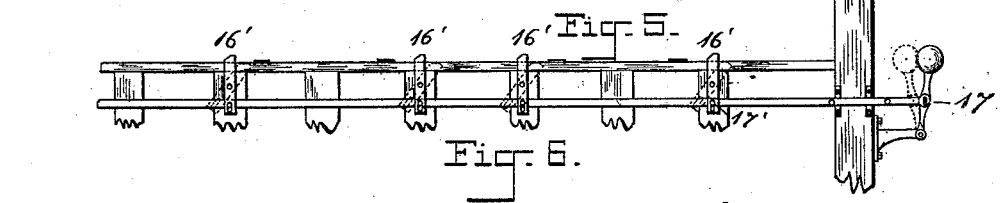
Fig. 5.
Fig. 6.
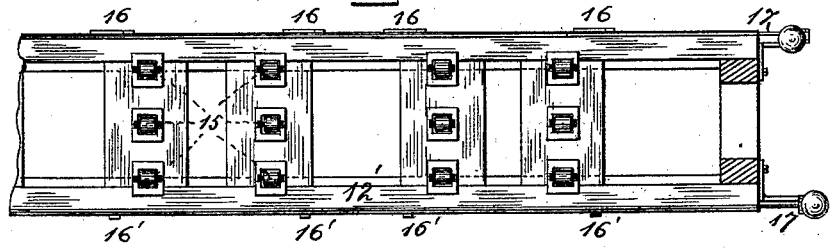
Fig. 7.
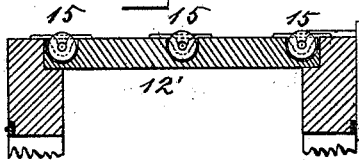
Witnesses
Lillie Hanna
Geo. H. Knight Jr.
Inventor
J. C. Chamberlain
By Knight Bros
Attorneys (No Model.) 5 Sheets—Sheet 3.
J. C. CHAMBERLAIN.
DEVICE FOR UNLOADING, RECHARGING, AND RELOADING ELECTRIC CAR BATTERIES.
No. 427,459. Patented May 6, 1890.
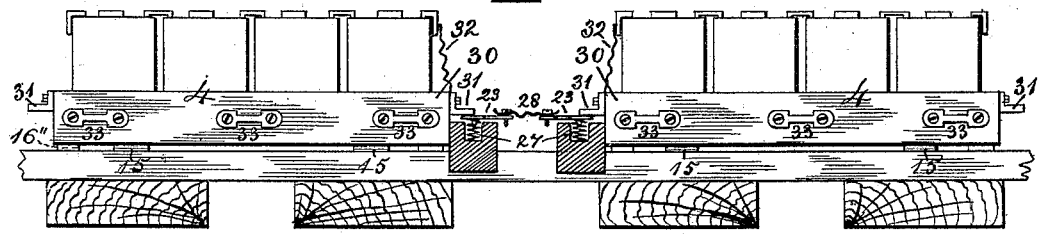
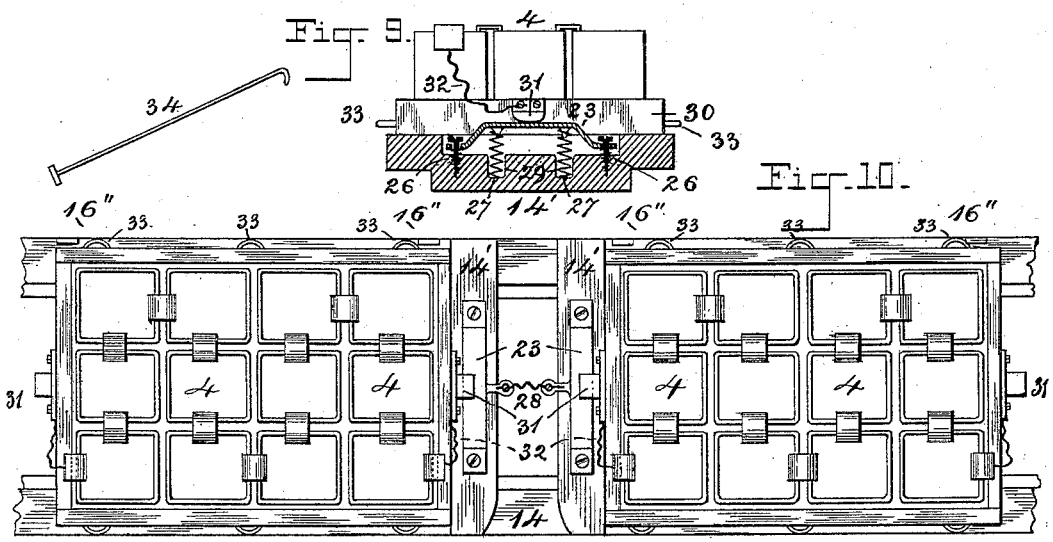
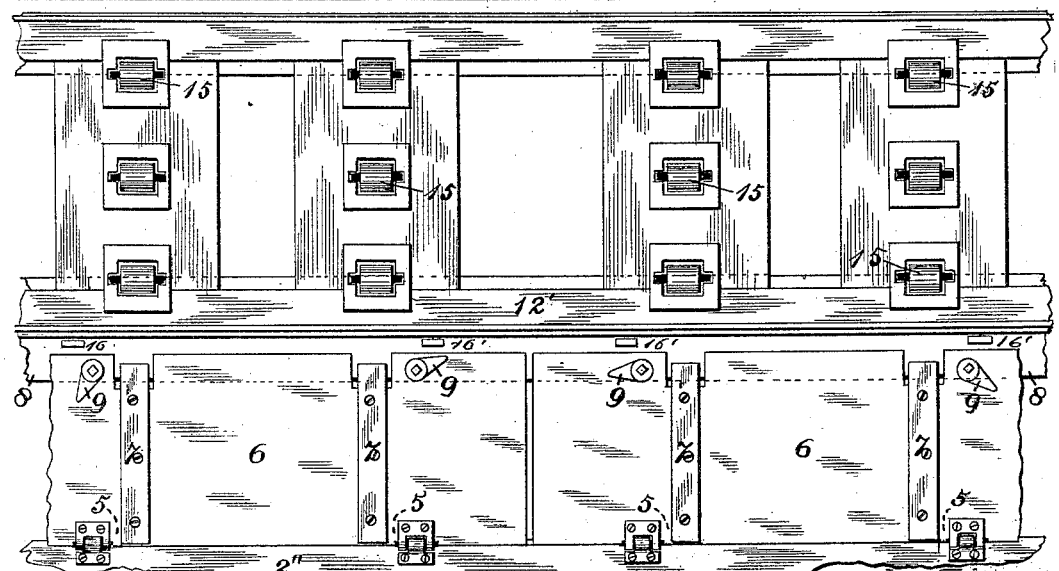

(No Model.) 5 Sheets—Sheet 4.

J. C. CHAMBERLAIN.
DEVICE FOR UNLOADING, RECHARGING, AND RELOADING ELECTRIC CAR BATTERIES.

No. 427,459. Patented May 6, 1890.

Witnesses
Inventor
By Attorneys (No Model.) 5 Sheets—Sheet 5.
J. C. CHAMBERLAIN.
DEVICE FOR UNLOADING, RECHARGING, AND RELOADING ELECTRIC CAR BATTERIES.
No. 427,459. Patented May 6, 1890.
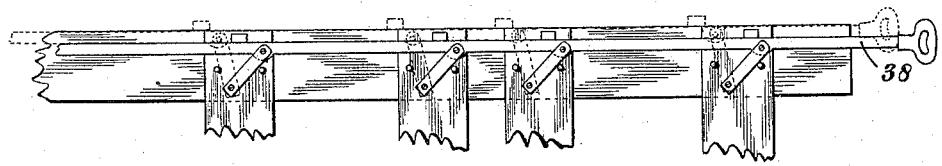
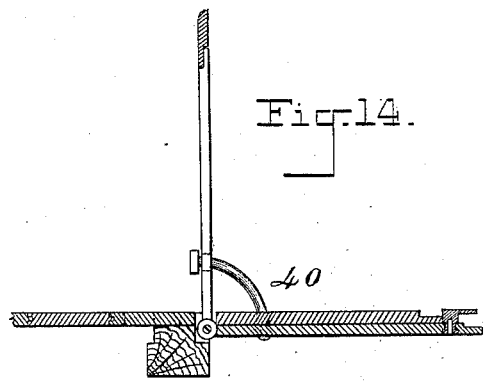
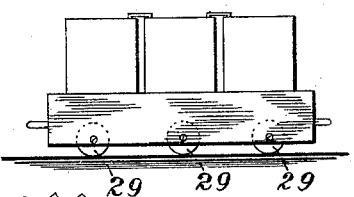
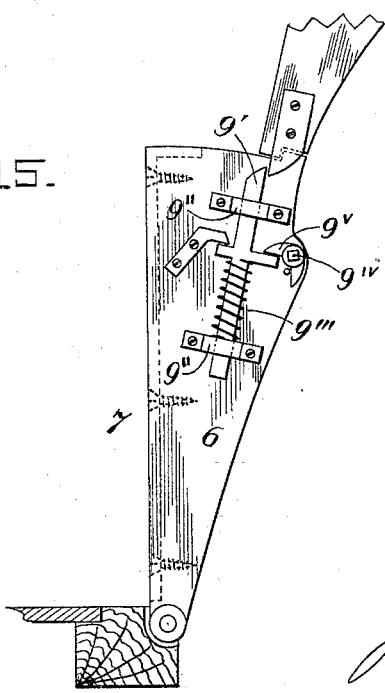
Witnesses.
E. Arthur
Geo. E. Cruse.
Inventor
J. C. Chamberlain
By Knight Bros
Attorneys

UNITED STATES PATENT OFFICE.

JACOB C. CHAMBERLAIN, OF NEW YORK, N. Y.

DEVICE FOR UNLOADING, RECHARGING, AND RELOADING ELECTRIC-CAR BATTERIES.

SPECIFICATION forming part of Letters Patent No. 427,459, dated May 6, 1890.

Application filed July 10, 1889. Serial No. 317,008. (No model.)

*To all whom it may concern:*

Be it known that I, JACOB CHESTER CHAMBERLAIN, of New York, in the county and State of New York, have invented a new and useful Device for Unloading, Recharging, and Reloading Electric-Car Storage-Batteries, of which the following is a specification.

My invention is for use with those electric cars whose current is derived from storage-batteries ("secondary batteries" or "accumulators") located upon the car itself, the purpose of the invention being to enable the substitution of charged for exhausted batteries in the most expeditious, economical, and effective manner possible.

Figure 1:
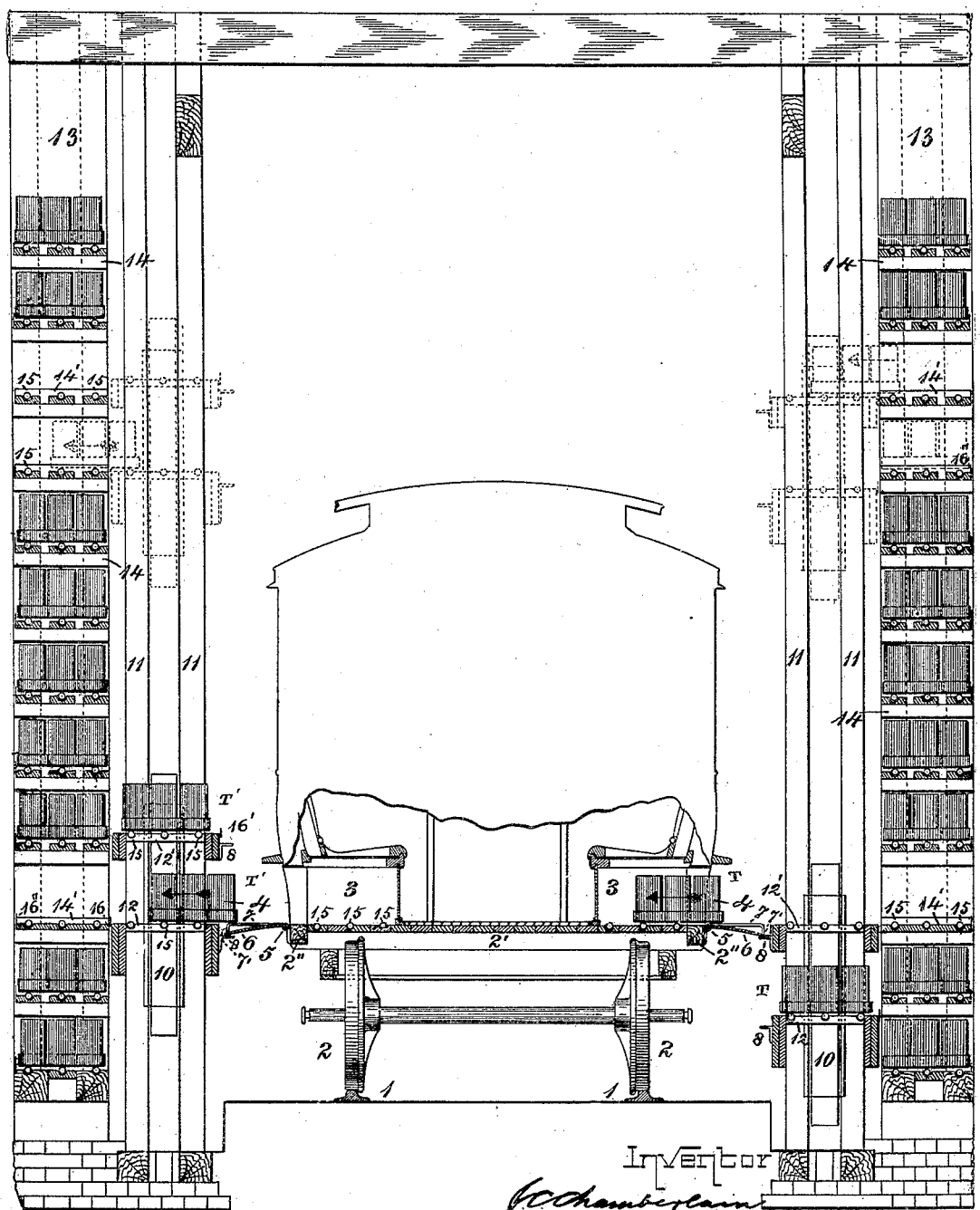
Figure 11:
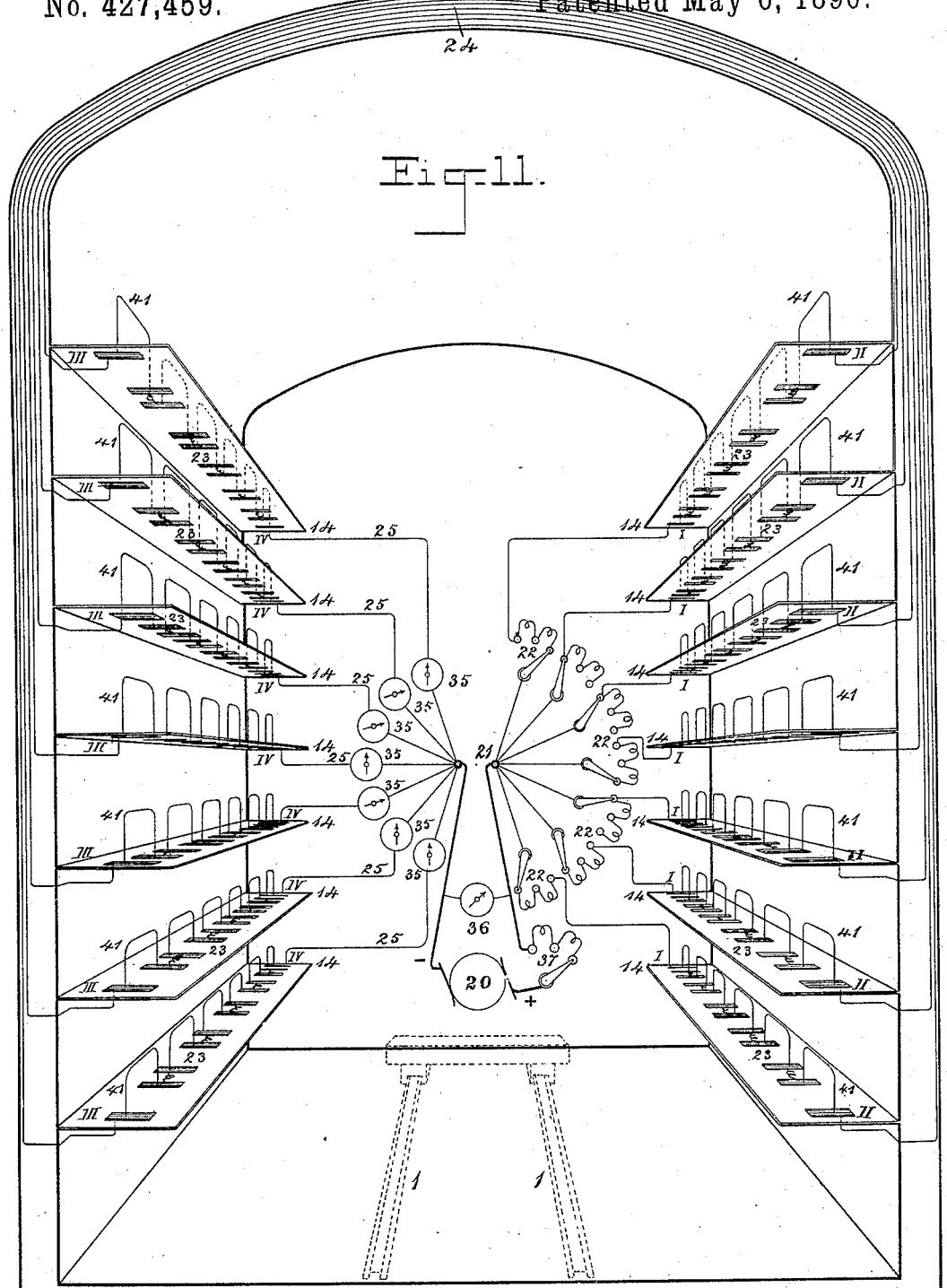

Referring to the accompanying drawings, which form a part of this specification, Figure 1 is a vertical transverse section of an apparatus embodying my invention, showing the means employed by me for unloading spent batteries, for distributing them on my recharging-racks, for recharging said batteries, and for loading them back into a car. Fig. 2 is a side elevation of one of my recharging-racks with its attendant distributing hoist or carrier. Fig. 3 shows the hoisting-winch in edge elevation. Fig. 4 is a top view of the hoisting-winch and the distributing-carrier. Fig. 5 is a side elevation of a portion of one of my distributing-carriers. Fig. 6 is a plan of the same. Fig. 7 is a section of the same on the line 7 7. Fig. 8 shows two batteries in side elevation upon a charging-bench or rack-shelf represented in section. Fig. 9 is a section of the same on the line 9 9. Fig. 10 is a plan view of portions of the car-floor with its hinged bridges and of the distributing-carrier and charging-bench. Fig. 11 is a diagrammatic representation of the recharging-circuit. Figs. 12, 13, 14, and 15 represent modifications of certain details.

Each "slip" or "charging-stall" combines the following instrumentalities: 1 1 represent a pair of rails of an ordinary street-car track or a branch thereof. 2 represents part of the running-gear of a street-car, and 2' 2" respectively represent parts of the bed or body and of a bed-sill. The spaces under the seats are utilized in the customary way as receptacles or closets 3, to receive and hold batteries 4, which, when housed within said closets, are coupled up with each other and with the motor in any approved way.

Hinged, as at 5, to the bed-sill on each side of the car are my "draw-bridges," of which each consists of a panel 6 (which, when closed, constitutes a part of the car side) and steel or iron gangway tracks or skids 7, (two to each battery,) whose downturned lips 7' are in the open position of said bridge (see Figs. 1 and 10) supported by rests or steps 8, which project from that side of my distributing-carrier which is nearest the car. Latches 9 serve to fasten the bridges in the closed position at all times except during the shift of batteries.

My device in its most complete form has two recharging-racks, each attended by a distributing-carrier. Each distributing cage or carrier 10 is guided vertically in stanchions 11, and each has, preferably, two decks or platforms 12 12', which extend the entire length of the discharging-racks 13. Each recharging-rack comprises several tiers or ranks of charging-benches 14, of which each is long enough to contain the complete gang of batteries (say six) for one side of the car. The number of these benches is preferably as great as can be conveniently utilized in the allotted height. One pair of these benches is preferably at the level of the car-floor, and the others are disposed either below or above that level or arranged, as in the present illustration, some below and some above said level. The capacity of the charging-racks must be such as to enable a constant reserve of at least a full complement (say twelve) of charged batteries ready for instant application on the entrance of a spent car into the slip or stall. When the service is a very large one, the arrangement may include a group of such stalls, each having its switch-connections with the main track. Guard rails or cleats 14', secured to the benches 14, serve to guide the batteries onto the benches and to keep them the proper distance apart.

Horizontal shifting of the batteries is facilitated by rollers 15 on the respective floors. Stops 16 16', pivoted to the carrier-platforms, (capable of simultaneous depression, as at $x$, or elevation, as at $y$,) permit either removal of the batteries, as at T, or their retention, as at T'. For reasons hereinafter explained the lower platforms 12 have their stops 16 located on the side remote from the car, and the upper platforms 12' have their stops 16' located on the side nearest to the car. Each gang of stops is capable of simultaneous depression or elevation by any suitable means—such as a bar or rod 17, connected to the respective stops by pivots 17'. Each rack-bench has on its side remote from the carrier rigidly-attached stops 16'''. Both carriers are made capable of being simultaneously shifted vertically and retained at any desired level by the represented or any suitable winch or raising and lowering mechanism 18, from which such carrier is suspended by means of wire cables 19.

The multiplicity of batteries in various stages of shifting and charging, and consequently great extent of charging-space, is required by the necessity of maintaining an ample reserve of fully-charged batteries, so that the time of detention of any car for battery replenishment may be reduced to a minimum, in view of the fact that more time is customarily consumed in recharging a battery than is taken up in exhausting it by use on the route.

Expeditious and practically automatic recharge of the batteries the instant that the last of the gang of (say twelve) batteries reaches its place on the rack-bench is secured by any suitable arrangement of contact pieces and circuit. For example, 20 may represent any suitable source of current whose outgoing conductor + branches, as at 21, to as many rheostat-switches 22 as there are benches in a rack. Electrical communication is made at the discretion of the intendant through one (or more) of these switches to the first contact I in a series of contact-plates 23 on the corresponding bench (or benches) and thence serially through the entire rank or gang of batteries on such bench to the terminal contact II on that bench. From thence the current passes, by conductors 24, to the first contact III of the corresponding bench of the other rack, and, similarly, through the ranks of batteries thereon to its terminal IV, and thence, by conductor 25, to the home-going wire — of the current-source.

In Fig. 11 the current-paths of the batteries are represented diagrammatically by the loops 41.

The means of automatic coupling of the consecutive batteries while in place on the charging-rack are preferably as follows: Each contact-plate 23 is normally uppressed against the heads of two guide-bolts 26 by springs 27. The screwing down or up of said bolts determines the normal level of the said contact-plate. One such contact-plate is situated outside each outermost battery on each bench and connects with the circuit-wires, as already explained, and shown at I, II, III, and IV, respectively. Two such plates (see plates 23, Figs. 8, 9, and 10) are provided between each two consecutive batteries and are coupled by wires or strips 28. The lower ends of the springs 27 occupy sockets 29 in the cleats 14'. Each battery-tray 30 has fastened to opposite ends of it metallic lugs 31, which, when the battery is brought to its proper position on the charging-bench, come in contact with the crowns of the contact-plates 23. Each of these lugs has suitable electrical connection 32 with the system of battery-electrodes. The described elastic supports 27 of the contact-plate 23 enable its automatic adaptation to the opposed surface of the lug 31. Eyes 33 on the battery-trays receive hooks 34, by which the operatives shift the batteries, as above stated. The intendant, having examined the ammeters 35 and the voltmeter 36, can, by throwing greater or less resistance into the rheostats 22 or 37, regulate the charging-current at discretion.

The slip being empty and in readiness for a spent car, the operation of my distributing-carriers is as follows: The upper platforms being supplied with two entire gangs of charged batteries, and the lower platforms being vacant, the carriers are lowered to a position which places their lower platforms at the level of the car-floor. A spent car having been brought to the proper place in the slip, its bridges are unlatched and let down upon the carrier-steps and the spent batteries are run out onto the lower platforms of the carriers. The bridges being then momentarily lifted, the carriers are dropped to position, which brings their upper platforms level with the car-floor, and the bridges are then allowed to rest upon the upper steps. The two gangs of charged batteries having been then loaded into the car and the bridges closed and locked, the car is again ready for duty and is backed out of the slip. Meanwhile the two gangs of spent batteries are run onto any pair of charging-benches that may be at the time vacant. If they happen to be the pair which is on a level with the lower platforms, the two gangs may be simply shifted directly onto such vacant benches; but for shifting onto any other pair the hoist is brought into requisition and the carriers are shifted vertically until the proper level is reached and are then unloaded. The slip is then put in condition of preparedness for the next car entry by a repetition of the operations already recited. In these several shifts the stops 16 16' are always placed in the erect or effective position for loading batteries onto their respective platforms and depressed, so as to be out of the way for unloading. Current being switched onto each charging-bench in advance of its reception of spent batteries, the charging process is automatically initiated the instant all the batteries of the gang are in place and continues to flow without further attention until saturation is reached—a condition which will be indicated by the needle on its ammeter pointing to zero. Saturation having been reached, that particular pair of benches may be cut out of circuit.

By the means and operation hereinabove recited the time required for rendering a spent car fit for service is reduced to its lowest terms.

The above-described preferred form of my device is susceptible of various modifications without departure from the essential principles of the invention. For example, a single bar 38, such as shown in Fig. 12, might be substituted for the separate pivoted stops. Wheels 29 on the battery-trays may be used instead of rollers on the several floors. (See Fig. 13.) The draw-bridges may be self-supporting in the open position, as at 40 in Fig. 14.

Fig. 15 represents a form of my hinged gangway and fastening-latch. 6 represents the panel, which may be of wood. 7 is one of the steel skids or tracks. 9′ is a latch-bolt, (of which there are two or more to each gangway,) which is confined in guides 9″ and is protracted to the normal or effective position which it occupies in the drawings by springs 9‴. 9$^{iv}$ is a rod which extends across the gangway and has fingers 9$^{v}$, which being made to press upon lugs 9$^{vi}$ on the latch-bolts causes their simultaneous retraction, so as to enable the gangway to be opened.

Having thus described my invention, the following is what I claim as new therein and desire to secure by Letters Patent:

1. In a device for unloading, recharging, and reloading electric-car batteries, the combination, with a source of electricity and an electric circuit, of a rack having several horizontal and superimposed charging-benches and a distributing hoist or carrier, substantially as set forth.

2. In a device for unloading, recharging, and reloading electric-car batteries, the combination, with a source of electricity, an electric circuit, and a car-track, of a rack having several horizontal and superimposed charging-benches and an interposed distributing hoist or carrier, all substantially as set forth.

3. In a device for unloading, recharging, and reloading electric-car batteries, the combination, with a source of electricity and an electric circuit, of a pair of racks each having several horizontal superimposed charging-benches and a pair of distributing-hoists in connection with said racks, substantially as set forth.

4. In a device for unloading, recharging, and reloading electric-car batteries, the combination, with a car-track and a charged circuit, of a pair of charging-racks which flank such track and a pair of distributing hoists or carriers interposed between such track and said charging-racks, substantially as set forth.

5. In a device for unloading, recharging, and reloading electric-car batteries, the combination, with a charging-rack having several superimposed benches and with a car having a receptacle for batteries, of a double-decked distributing carrier or hoist arranged to operate in connection with the said rack and car, substantially as set forth.

6. In a device for unloading, recharging, and reloading electric-car batteries, the combination, with a charging-rack having several superimposed benches and with a car whose battery-closets can be opened on their outer sides, of a double-decked distributing carrier or hoist interposed between the car-track and the said rack, as and for the purpose set forth.

7. In a device for unloading, recharging, and reloading electric-car batteries, the combination, with the battery-closet of an electric car, of the hinged skids or gangway-tracks 7, for the purpose explained.

8. In a device for unloading, recharging, and reloading electric-car batteries, the combination, with the battery-closet of an electric car, of the draw-bridge consisting of hinged panel 6 and skids or gangway-tracks 7.

9. In a device for unloading, recharging, and reloading electric-car batteries, the combination, with the battery-closet of an electric car and with distributing-carrier platform, of a bridge or gangway-track whose lower edge is hinged to said closet-floor and whose upper edge, when in the open condition, is capable of resting on the carrier and has a fastening device which secures it in the closed condition in the manner explained.

10. In a device for unloading, recharging, and reloading, the combination, with an electric car, of a draw-bridge hinged to the bed-sill and serving as a closed panel in the fastened condition and as a skid or gangway-track in the unfastened condition, substantially as set forth.

11. In a device for unloading, recharging, and reloading electric-car batteries, the combination, with a charging-rack and with a skid or gangway-track hinged to the car, of a distributing hoist or carrier having a step or rest for the outer edge of said gangway-track, as set forth.

12. In a device for unloading, recharging, and reloading electric-car batteries, the combination, with a distributing hoist or carrier for secondary batteries, of withdrawable stops 16 16′, substantially as and for the purpose set forth.

13. In a device for unloading, recharging, and reloading electric-car batteries, the combination, with a distributing hoist or carrier for secondary batteries, of a series of stops 16, pivoted in the paths of the battery-trays and all to a single handle, so that the entire series can be projected above or retracted below the carrier-floor, for the purposes designated.

14. In a device for unloading, recharging, and reloading electric-car batteries, the double-decked distributing hoist or carrier having withdrawable stops in rear of its lower and in front of its upper deck or platform, for the purposes explained.

15. In a device for recharging electric-car batteries, the combination of a pair of charging-racks, of which each has several superimposed charging-benches, a series of spring-contacts on each bench, contact-lugs on the batteries, electrical communication with a current-supply, and means for cutting any pair of such benches in or out of circuit, substantially as set forth.

16. In a device for recharging electric batteries, the combination, with a lug that projects from the battery and is in electrical communication with the battery-cells and with a rack or bench that receives and supports such battery, of a contact-plate in the electric circuit supported by springs and held by bolts upon such rack, as and for the purposes set forth.

17. The fastening for the hinged gangway of an electric car, consisting of the spring-latches $9'$ and the releasing-rod $9^{iv}$, substantially as set forth.

J. C. CHAMBERLAIN.

Witnesses:
   HARRY E. KNIGHT,
   MAZIE V. BIDGOOD.